US012695772B2

(12) United States Patent
Qi et al.

(10) Patent No.: US 12,695,772 B2
(45) **Date of Patent: \*Jul. 28, 2026**

(54) BOT DETECTION THROUGH EXPLAINABLE DEEP LEARNING AND RULE VIOLATION CODEBOOKS FROM GENERATIVE ARTIFICIAL INTELLIGENCE

(71) Applicant: PAYPAL, INC., San Jose, CA (US)

(72) Inventors: Panpan Qi, Singapore (SG); Zhe Chen, Singapore (SG); Quan Jin Ferdinand Tang, Singapore (SG); Fei Pei, San Jose, CA (US); Omkumar Mahalingam, Santa Clara, CA (US); Mandar Ganaba Gaonkar, Fremont, CA (US); Ting Lin, Singapore (SG); Gaurav Vishwanath Rane, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/975,509

(22) Filed: Dec. 10, 2024

(65) Prior Publication Data

US 2025/0211604 A1 Jun. 26, 2025

Related U.S. Application Data

(63) Continuation of application No. 18/396,550, filed on Dec. 26, 2023, now Pat. No. 12,556,558.

(51) Int. Cl.
| | |
|---|---|
| *H04L 9/40* | (2022.01) |
| *G06N 3/0455* | (2023.01) |
| *G06N 3/08* | (2023.01) |

(52) U.S. Cl.
CPC ....... *H04L 63/1425* (2013.01); *G06N 3/0455* (2023.01); *G06N 3/08* (2013.01); *H04L 63/20* (2013.01)

(58) Field of Classification Search
CPC ... H04L 63/1425; H04L 63/20; G06N 3/0455; G06N 3/08
See application file for complete search history.

(56) References Cited

U.S. PATENT DOCUMENTS

| | | |
|---|---|---|
| 2013/0036342 A1 | 2/2013 | Deo et al. |
| 2020/0259861 A1 | 8/2020 | Margel et al. |

(Continued)

*Primary Examiner* — Kostas J Katsikis
(74) *Attorney, Agent, or Firm* — Haynes and Boone, LLP

(57) ABSTRACT

There are provided systems and methods of bot detection through explainable deep learning and rule violation codebooks from generative AI. A service provider, such as an electronic transaction processor for digital transactions, may provide computing services to users for processing various requests and interactions with those users. However, malicious users may utilize bots, such as automated scripts and software applications, that attempt to conduct fraud, compromise systems and data, and the like. To provide better bot and bot activity detection, the service provider may implement an explainable deep learning system that may generate rule violations of rules indicating bot activity or presence in computing logs and interactions using a generative AI. The violations may have a corresponding explanation in codebooks to automate bot detection. When bot activity is detected, the explanation may provide a reason for the bot activity detection.

17 Claims, 7 Drawing Sheets

400a

Receive a request to a generative AI that queries the generative AI of whether a violation of a rule can be created from telemetry data from a network traffic logs — 402

Determine the telemetry data for device activity parameters that corresponds to past telemetry data violating the rule from past learned examples by the generative AI — 404

Generate the rule violation using the generative AI, the device activity parameters, and/or queries of network traffic logs for the corresponding device activity parameters in additional telemetry data — 406

Add the rule violation to a rule violation codebook used by an intelligent detection engine — 408

(56)  References Cited

U.S. PATENT DOCUMENTS

| | | |
|---|---|---|
| 2022/0210184 A1 | 6/2022 | Nakar et al. |
| 2023/0409702 A1 | 12/2023 | Shahat |
| 2024/0056479 A1 | 2/2024 | Senecal et al. |
| 2024/0089276 A1 | 3/2024 | Zhang et al. |
| 2024/0137371 A1 | 4/2024 | Almulhim et al. |
| 2025/0016192 A1* | 1/2025 | Montgomery ...... H04L 63/1441 |
| 2025/0045514 A1 | 2/2025 | Zohar et al. |
| 2025/0068741 A1* | 2/2025 | Lafon ................. G06F 16/3344 |
| 2025/0094735 A1 | 3/2025 | Saikia et al. |

* cited by examiner

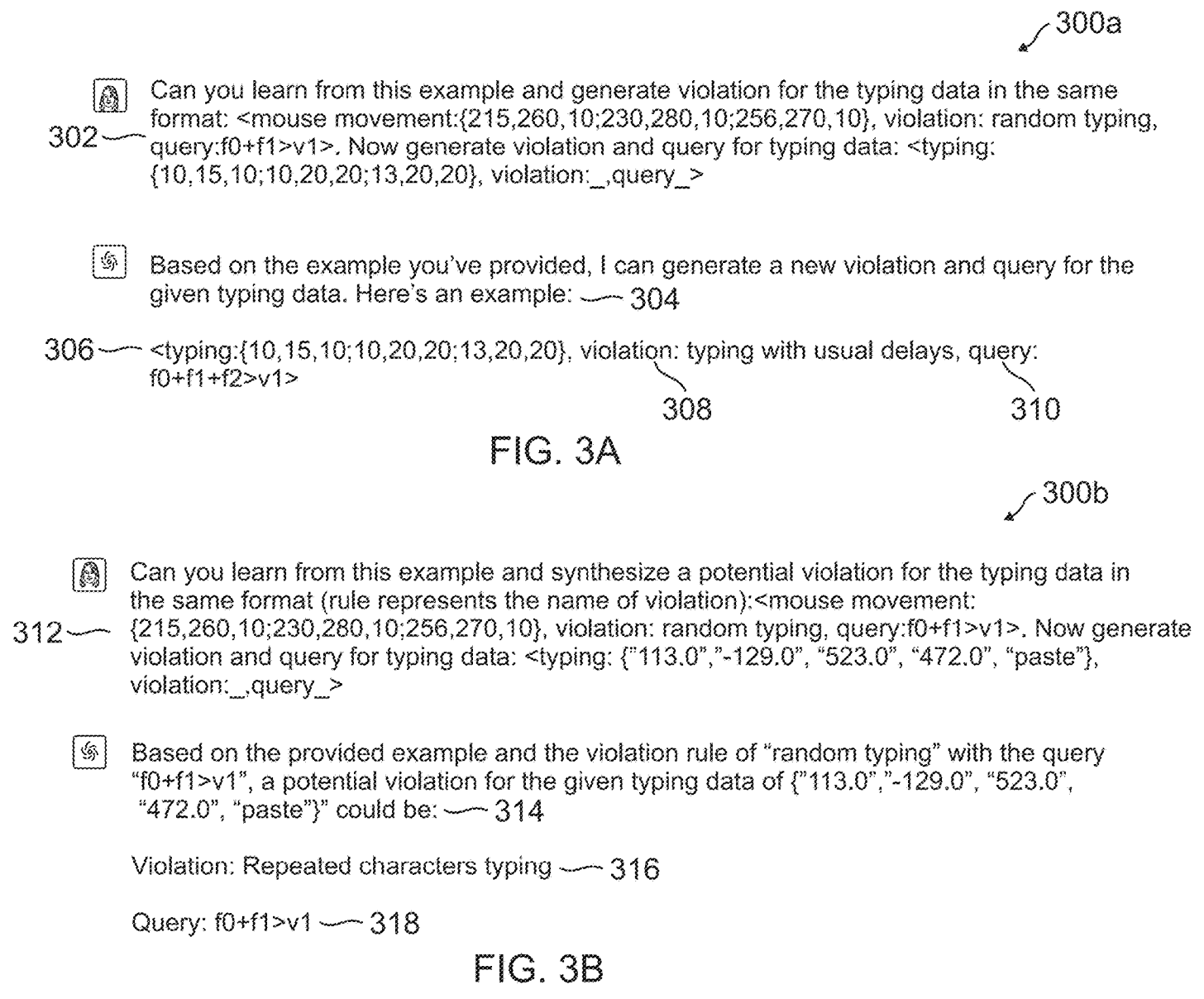

300a

302 — ⟨A⟩ Can you learn from this example and generate violation for the typing data in the same format: <mouse movement:{215,260,10;230,280,10;256,270,10}, violation: random typing, query:f0+f1>v1>. Now generate violation and query for typing data: <typing: {10,15,10;10,20,20;13,20,20}, violation:__,query_>

304 — ⟨S⟩ Based on the example you've provided, I can generate a new violation and query for the given typing data. Here's an example:

306 — <typing:{10,15,10;10,20,20;13,20,20}, violation: typing with usual delays, query:
     f0+f1+f2>v1>

312 — ⟨A⟩ Can you learn from this example and synthesize a potential violation for the typing data in the same format (rule represents the name of violation):<mouse movement: {215,260,10;230,280,10;256,270,10}, violation: random typing, query:f0+f1>v1>. Now generate violation and query for typing data: <typing: {"113.0",-129.0", "523.0", "472.0", "paste"}, violation:__query_>

314 — ⟨S⟩ Based on the provided example and the violation rule of "random typing" with the query "f0+f1>v1", a potential violation for the given typing data of {"113.0",-129.0", "523.0", "472.0", "paste"}" could be:

Violation: Repeated characters typing —— 316

Query: f0+f1>v1 —— 318

FIG. 3B

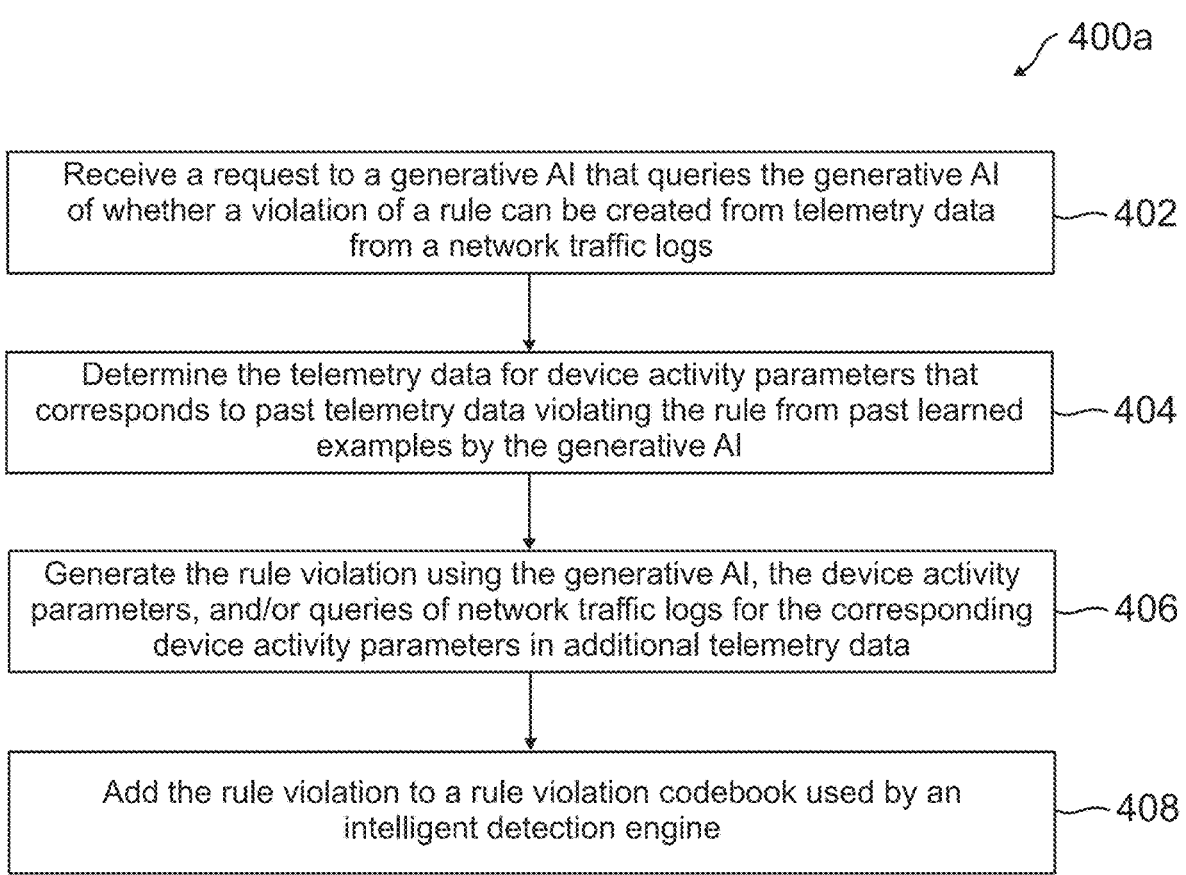

400a

Receive a request to a generative AI that queries the generative AI of whether a violation of a rule can be created from telemetry data from a network traffic logs — 402

Determine the telemetry data for device activity parameters that corresponds to past telemetry data violating the rule from past learned examples by the generative AI — 404

Generate the rule violation using the generative AI, the device activity parameters, and/or queries of network traffic logs for the corresponding device activity parameters in additional telemetry data — 406

Add the rule violation to a rule violation codebook used by an intelligent detection engine — 408

FIG. 4A

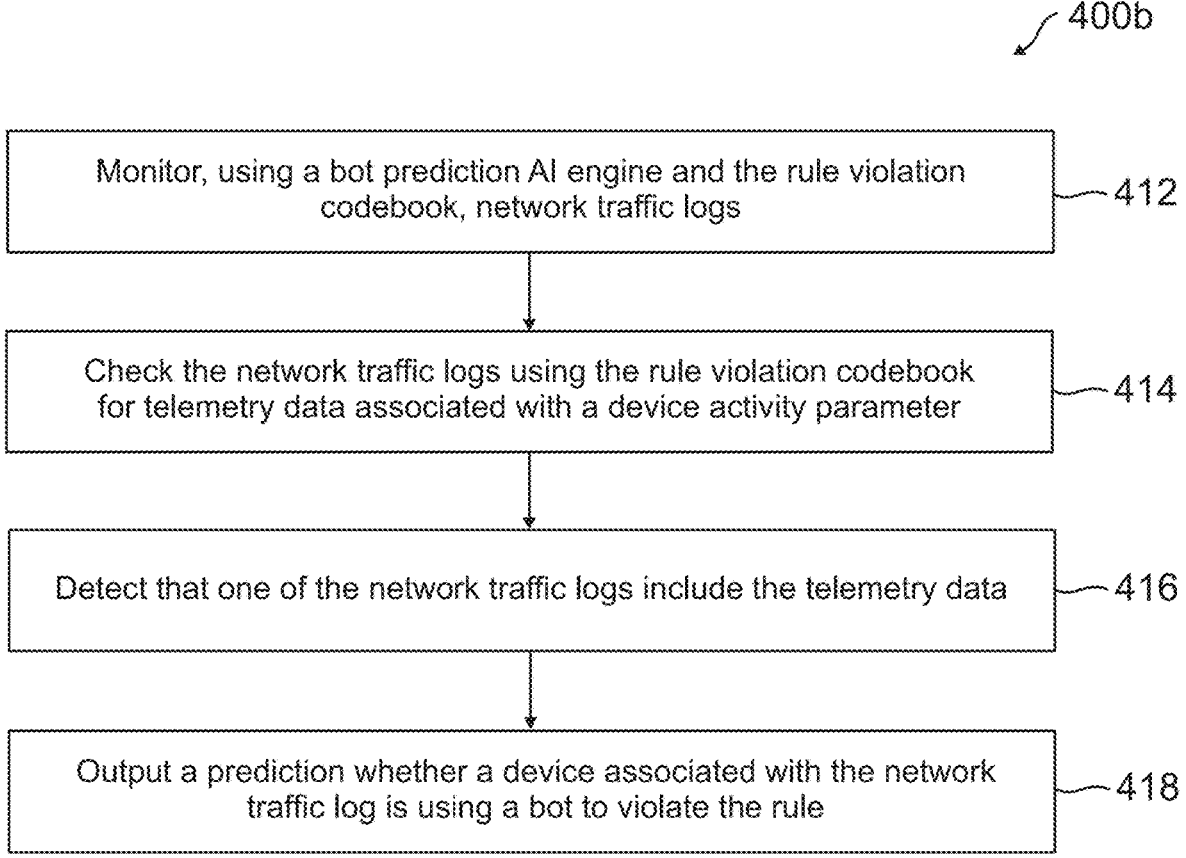

400b

Monitor, using a bot prediction AI engine and the rule violation codebook, network traffic logs ~412

Check the network traffic logs using the rule violation codebook for telemetry data associated with a device activity parameter ~414

Detect that one of the network traffic logs include the telemetry data ~416

Output a prediction whether a device associated with the network traffic log is using a bot to violate the rule ~418

FIG. 4B

BOT DETECTION THROUGH EXPLAINABLE DEEP LEARNING AND RULE VIOLATION CODEBOOKS FROM GENERATIVE ARTIFICIAL INTELLIGENCE

CROSS REFERENCE TO RELATED APPLICATION

This application is a continuation of U.S. patent application Ser. No. 18/396,550, filed Dec. 26, 2023, all of which is incorporated by reference herein in its entirety.

TECHNICAL FIELD

The present application generally relates to machine learning (ML) and other artificial intelligence (AI) systems and more particularly to using rule violations from a generative AI to detect bots that run computing automation scripts and attacks.

BACKGROUND

Users may utilize computing devices to access online domains and platforms to perform various computing operations and view available data. Generally, these operations are provided by different service providers, which may provide services for account establishment and access, messaging and communications, electronic transaction processing, and other types of available services. The service provider may utilize one or more applications, platforms, and/or decision services that implement and utilize ML and other AI (e.g., neural networks (NN), rule-based engines, etc.) models for data processing, decision-making, classifications, predictions, and the like to provide computing services, such as electronic transaction processing, account services, messaging, and the like. However, as hackers and other malicious users or entities become more sophisticated, they may perform different computing attacks and other malicious conduct to compromise these communications. For example, attacking entities may use scripted bots that replay an attack numerous times and/or substitute different potential compromised or malicious information for account takeovers, credential stuffing, and/or brute force attacks. Other attacking entities may automate data entry and/or navigation through known webpages, application interfaces, and the like. Without accurately and quickly identifying these attackers and performing remedial actions, the service provider may risk fraud, loss, and decreased customer trust or satisfaction. Thus, it is desirable to provide more robust and sophisticated operations and systems that detect suspicious and/or malicious activities by bad actors.

BRIEF DESCRIPTION OF THE DRAWINGS

FIGS. 3A-3C are exemplary diagrams of prompts to a generative AI and resulting outputs of rule violations by the generative AI for detecting bots and bot activity, according to an embodiment;

FIGS. 4A and 4B are flowcharts of an exemplary process for bot detection through explainable deep learning and rule violation codebooks from generative AI, according to an embodiment.

Figure 1:
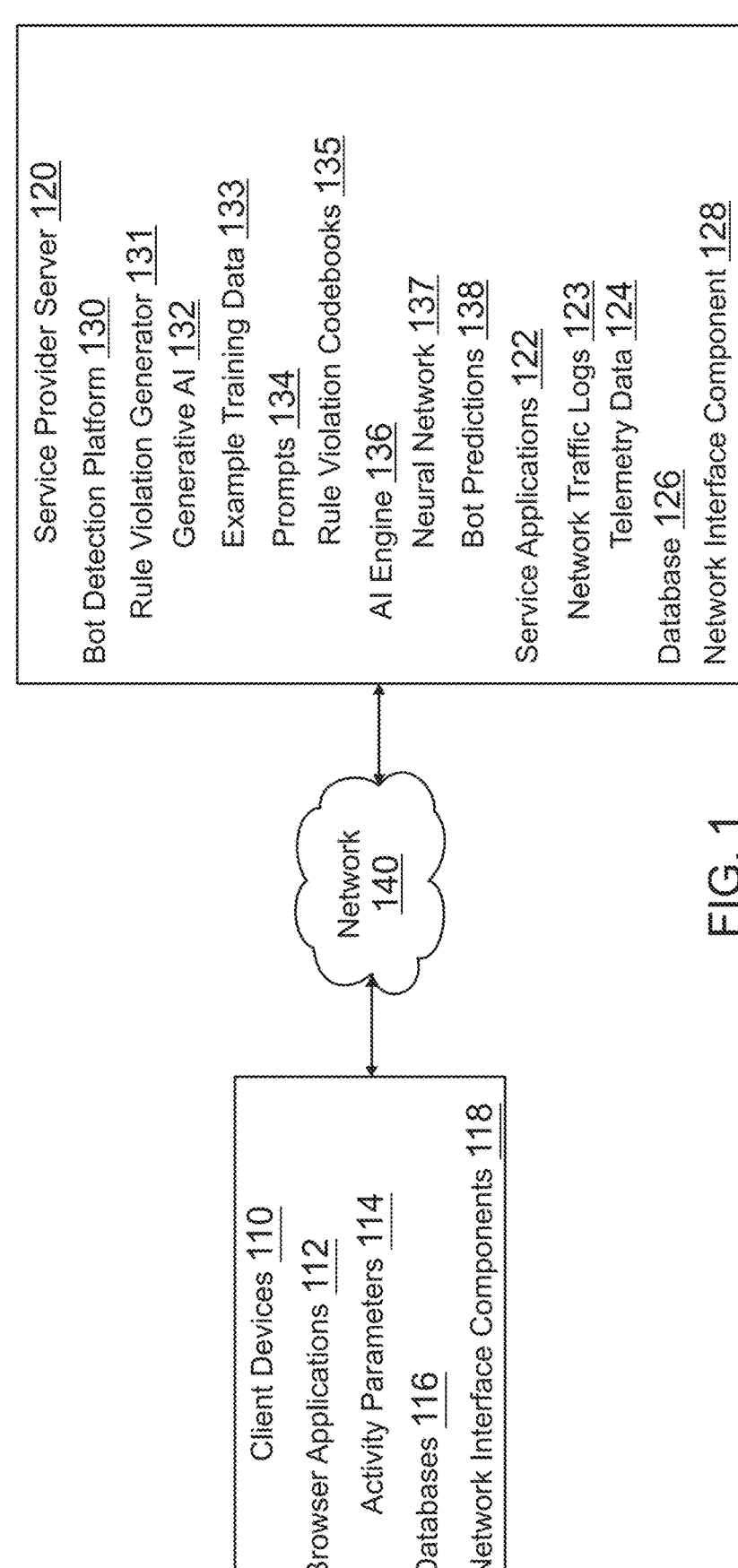
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for bot detection through explainable deep learning and rule violation codebooks from generative AI. Systems suitable for practicing methods of the present disclosure are also provided.

In network communications including interactions between online platforms and systems of service providers and client devices of end users, service providers may provide computing services to users and other entities through computing architectures. Such provision of services and corresponding computing architectures may face different types of computing attacks coming from malicious users and sources over a network. For example, a malicious actor may initiate a computing attack on the computing environment of the service provider, such as an eavesdropping attack, a password attack and/or account takeover, a web abuse (e.g., account enumeration, brute force attacks, SQL injection), or other type of computing attack that may compromise services (e.g., electronic transaction processing services) and/or expose data (e.g., personally identifiable information (PII) and/or funding source information) to the malicious actor. Computing attacks may be executed through automated computing bots or operations, such as executable scripts and bots that may quickly repeat computing attacks to try different data and/or overwhelm a system. These computing attacks may lead to fraud and loss by the service provider. For example, a scripted bot that performs account enumeration may proceed through a list of potentially compromised account usernames, passwords, or other credentials. Other shell scripts may also automate other processes and operations, including program or application executables that automate navigations, probe computing architecture for vulnerabilities, perform automated interface form filling, and the like.

In order to assist in preventing or minimizing these computing attacks and other abuses, a service provider, in various embodiments, may utilize a explainable deep learning bot detection process and system in their computing architecture that predicts, classifies, and/or detects if a computing device may be used by a malicious actor, including users and scripts executed by those users, as well as provide explanations for such detections and/or classified bot activity. In this regard, the service provider may generate rule violations with corresponding explanations using a generative AI, such as an ML or other AI engine that implements a large language model (LLM), generative pre-trained transformer (GPT, such as ChatGPT), or the like, which may be used to provide conversational responses to queries and requests by users. A prompt may be provided to the generative AI, which may identify telemetry data for device activities and device activity parameters from network traffic logs or other computing logs (e.g., firewall logs, IP logs, etc.), as well as examples of other rules and/or rule violations for the service provider. The generative AI may then respond to the prompt or other conversational request with an answer having the rule violation that identifies and/or includes at least a portion, section, or part the telemetry data that may indicate when the rule is violated by device activity parameters, a type or explanation of the rule violation, and a new query that identifies when the portion of the telemetry data for the device activity parameters is found in further network traffic logs.

These rule violations may have an explanation of what violates the rule and why from the generative AI, which may be provided in the response text for the determined rule violation. This explanation may be added with the rule violation to a rule violation codebook, which may allow a neural network (NN) or other ML model to process, parse, monitor, and/or review network traffic logs or other logs for rule violations. The NN or other ML model may be implemented in a bot detection AI engine, which may utilize the entries in the codebooks (e.g., feature vectors of the violation rules) to monitor and check network traffic logs for the presence of the telemetry data for the one or more device activity parameters indicating a violation of the rule, such as a bot presence and/or bot activity (e.g., an automated script or computing attack, a malicious program or malware, etc.). If present, the service provider may then implement remedial measures, including quarantining the device, account, or endpoint, preventing further activity, attempting claw back measures for fraudulent transactions, fixing or alerting engineers or administrators of vulnerabilities and system weaknesses, and the like.

For example, a service provider may provide different computing resources and services to users through different websites, resident applications (e.g., which may reside locally on a computing device), and/or other online platforms. In this regard, an online transaction processor may provide computing services associated with electronic transaction processing, digital accounts and account services, user authentication and verification, digital payments, risk analysis and compliance, and the like. Other exemplary services may include shopping and merchant marketplaces, social networking, microblogging, media sharing, messaging, business and consumer platforms, etc. Thus, a service provider, such as an online transaction processor (e.g., PAYPAL®), may provide computing services to users, including electronic transaction processing that allows merchants, users, and other entities to process transactions, provide payments, and/or transfer funds between these users.

When interacting with the service provider, the user may process a particular transaction and transaction data to provide a payment to another user or a third-party for items or services. Moreover, the user may view other digital accounts and/or digital wallet information, including a transaction history and other payment information associated with the user's payment instruments and/or digital wallet. The user may also interact with the service provider to establish an account and other information for the user. These computing services may be deployed across multiple different applications including different applications for different operating systems and/or device types. The account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services. However, malicious users, entities, and/or other computing devices (e.g., computing devices that may include malware, viruses, and the like that may be hijacked to automate computing attacks) may attempt to abuse the computing services and/or digital accounts in order to compromise (e.g., fraudulently obtain) sensitive data, which may lead to exploitation and/or unauthorized use by these malicious parties.

To address this problem, a service provider may execute one or more monitoring applications, bots, plugins, or applications configured to monitor activities of computing devices with the service provider's services and platforms based on network traffic logs and/or other computing logs for interactions with and requests to servers and endpoints of the service provider from the computing devices. These may detect suspicious activities associated with bot behaviors, such as automated computing scripts and applications, including failed login attempts, brute force login attempts or automated password enumeration, automated form filling and/or other automated data entry, excess separate logins and/or login attempts for different accounts, multiple form entry retrials and/or data entry, probing of system architecture and/or directory hierarchies, directory enumeration attempts, computing attacks on system resources, and the like. Further, other activities may indicate suspicious or malicious behavior of the computing device, such as those associated with authentication, lookup or retrieval of PII or other sensitive data (e.g., financial data), electronic transaction processing requests, and other services provided by the service provider. The service provider may perform this monitoring using rule violation codebooks having rule violations generated using a generative AI based on prompts to create such rule violations from telemetry data for device activity parameters and other device or network data.

To create the rule violations, an LLM or other ML or NN model of a generative AI may be queried of whether a rule violation may be generated from corresponding telemetry data from one or more network traffic logs, where the telemetry data and/or network traffic logs may correspond to suspicious or detected bot activities and/or behaviors, device activity parameters of interest and/or indicating bot behavior, and the like. The telemetry data may correspond to logs, metrics, events, or the like created by devices, network communications, applications, and the like when interacting with a server or other endpoint of the service provider, which correspond to particular data for different device activity parameters. The network traffic logs may therefore correspond to those logs having the telemetry data for device activity parameters that may be analyzed for rule violation generation. The LLM or other model of the generative AI may further be finetuned using existing documentation, existing rules, and/or other specific or proprietary data of the service provider and/or for the bot detection task of interest.

Examples may also be used to train and/or finetune the generative AI, may include an example of a device activity parameter, and the corresponding telemetry data for that parameter (e.g., specific input, range of values or fields, different recorded values, etc.). The examples may also include the violation rule for that example and the corresponding query to identify the telemetry data for the device activity parameter in network traffic logs. After training and/or tuning, the LLM may then be fed or provided a set of telemetry data of interest and/or corresponding to bot behavior for detection, as well as a request or query of whether a new rule violation can be generated having a query used for rule violation detection. Thus, the generative AI may use the LLM to generate and respond to the prompt with a rule violation having the telemetry data for the device activity parameter that is to be monitored (e.g., indicates suspicious or likely bot presence, activity, and/or behavior), the rule violation and/or explanation for the rule violation, and query for the rule violation. Such exemplary device activities and parameters for such activities may include mouse movements and ranges of movements, keyboard inputs, typographic inputs, copy-paste or other editing actions, and the like.

Once created, the rule violation may be added to one or more rule violation codebooks. A codebook may correspond to the rule violations and contain prototypes (e.g., feature vectors) for the violation rules. For example, a tuple in a code or processing language may be generated to include the telemetry data, the rule violation and explanation of the violation, and the violations format for use in querying, monitoring, or detecting the rule violation in further network traffic logs. As such, codebooks may be generated and/or include different rule violations and their corresponding telemetry data and query for different bot detection tasks and/or operations. For example, for generated potential violations, matched data for telemetry data from a database that corresponds to a sequence or set of data correlated with the rule may be determined. Thereafter, a feature transformation on the matched data (e.g., raw telemetry data) may be performed, and a prototype or the like of the rule and rule violation may be generated, which is associated with an explanation for the rule violation. These may be combined in a codebook so that prototypes of telemetry data from the database that matches or is correlated with a rule violate may be processed and used when monitoring network traffic logs.

Thereafter, an explainable bot detection pipeline may be used that corresponds to a sequence of steps to interact with and use the codebooks with a deep learning model, NN, or other ML model and/or technique to identify bots and other fraudulent activity. During training, representations of network traffic and corresponding logs from the codebooks may be used to train a deep learning model, such as a NN or other ML model, for bot detection from network traffic logs. For example, the prototypes of rule violations in the codebooks may correspond to feature vectors in a vector space (e.g., feature transformed telemetry data or the like), which allows for similarity vector comparisons (e.g., a cosine similarity or Euclidean distance between two vectors) and computations between the prototype features and the features transformed from the training samples (e.g., how close are the prototypes to the predicted bot activity or behavior for the telemetry data from the training samples). Using the features, similarities (e.g., strength of likelihood of bot detection), and other data, the model of the bot detection engine may be trained and tuned. Network traffic logs and/or other computing logs may be processed during an inference phase after training, where new or incoming network traffic logs are processed by applying feature transformation and using a feature-based representation (e.g., a vector for the feature data transformed from the logs) that is input to the deep learning model or other NN or ML model.

This then may predict whether the traffic and logs are indicative of bot behavior and/or activity, and therefore a potentially fraudulent or malicious bot. For example, the bot detection AI system and/or engine may be linked with a gateway to various service provider services, databases, and computing applications/services to handle incoming user requests and request orchestration. The engine may monitor and process the incoming or new network traffic logs (e.g., by performing feature transformation on telemetry data, as well as vector comparisons or the like for similarities of logs and/or telemetry data for device activity parameters to the rule violations). If suspicious bot activity is detected, the service provider may implement preventative or remediation steps or processes to prevent or fix potential fraud, attacks, harms, or other breaches of computing systems. This may include ending traffic and communications with a suspicious device or endpoint, quarantining the traffic and/or communications in another environment, issuing honeypot communications designed to elicit more information from the device or endpoint, notifying user or administrators, performing transaction claw back, or other steps.

Thus, by intelligently generating rule violations from past rule violations and telemetry data by a generative AI, further rule violations may be automatically created, and new violation coverage and potentially overlooked issues may be identified, which eliminates or reduces the time and manual efforts spent on writing rule violations. Further, the generative AI may provide a conversational output of a reason or explanation for the rule violation and what causes the rule violation, as well as the rule that was violated, which allows for system administrators, authority or enforcement personnel, and the like to identify an explanation for a detected rule violation and suspected bot activity or behavior and take appropriate actions. Actions may be automated including classify bots and/or devices as utilizing bots, ending connections or quarantining activities by suspicious devices and/or likely bots, and the like. As such, a NN or other ML/AI system may monitor network traffic logs in an intelligent and automated manner, with corresponding explanations provided when bot activity is detected. This may lead to increased efficiency and productivity of intelligent bot detection systems and engines, as well as improved decision-making and classification capabilities for such systems and engines. Additionally, by leveraging the power of generative AI, service providers may more efficiently and effectively automate management of rule violation writing and coding ecosystems, ensuring that bot detection systems provide accurate and robust coverage and protection from bot attacks, fraud, and/or other bot activity that is undesirable and/or malicious.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes client devices 110 and a service provider server 120 in communication over a network 140. Client devices 110 may be utilized by different end user, including valid actors and customers, as well as malicious users and other bad actors, to access a computing service or resource provided by service provider server 120, where service provider server 120 may provide various data, operations, and other functions to client devices 110 via network 140. In this regard, client devices 110 may perform activities with service provider server 120 that may be suspicious and/or malicious. Service provider server 120 may utilize an explainable deep learning model and engine that implements rule violation codebooks for rule violations for a generative AI for bot detection.

Client devices 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client devices 110 may be implemented as a communication device that may utilize appropriate hardware and software configured for wired and/or wireless communication with service provider server 120. For example, client devices 110 may be implemented as a personal computer (PC), a smart phone, laptop/tablet computer, wristwatch or wrist device with appropriate computer hardware resources, eyeglasses (e.g., GOOGLE GLASS®) or other type of wearable device with appropriate computer hardware, implantable communication devices, and/or other types of computing devices capable of transmitting and/or receiving data. Although only one device is shown, a plurality of devices may function similarly and/or be connected to provide the functionalities described herein.

Client devices 110 of FIG. 1 contains one or more browser applications 112, a databases 116, and a network interface components 118. Browser applications 112 may correspond to executable processes, procedures, and/or applications with associated hardware. Client devices 110 may include additional or different modules having specialized hardware and/or software as required.

Browser applications 112 may correspond to one or more processes to execute modules and associated components of client devices 110 to provide a convenient interface to permit a user for client devices 110 to browse webpages of websites including those provider by service provider server 120 and/or websites where service provider server 120 may provide computing services (e.g., electronic transaction processing services of service provider server 120 that are provided on third-party merchants, marketplaces, and/or other websites). In this regard, browser applications 112 may correspond to specialized hardware and/or software utilized by client devices 110 that may access websites, retrieve website and/or individual webpage data, display such data, allow interaction with and/or navigation between webpages and/or webpage data, and the like. In some examples, browser applications 112 may be used to provide transaction processing for items, such as through a user interface enabling the user to enter and/or view the items that the user associated with client devices 110 wishes to purchase. This may be based on transactions generated by browser applications 112 using one or more merchant websites.

Browser applications 112 may utilize user financial information, such as credit card data, bank account data, or other funding source data, as a payment instrument when providing payment information. Additionally, browser applications 112 may utilize a digital wallet associated with an account with service provider server 120 as the payment instrument, for example, through accessing a digital wallet or account of a user through entry of authentication credentials and/or by providing a data token that allows for processing using the account. Browser applications 112 may also be used to receive a receipt or other information based on transaction processing. However, different services may be provided via browser applications 112, including social networking, media posting or sharing, microblogging, data browsing and searching, online shopping, and other services available through service provider server 120. Thus, browser applications 112 may also correspond to different service applications and the like.

In various examples, browser applications 112 may correspond to a general browser application configured to retrieve, present, and communicate information over the Internet (e.g., utilize resources on the World Wide Web) or a private network. For example, browser applications 112 may provide a web browser, which may send and receive information over network 140, including retrieving website information, presenting the website information to the user, and/or communicating information to the website, including payment information for the transaction. However, browser applications 112 may include a dedicated application of service provider server 120 or other entity (e.g., a merchant), which may be configured to assist in browsing websites and/or processing transactions electronically, such as a mobile application on a mobile device.

Automated bots and scripts may utilize and/or be utilized through browser applications 112 to perform computing attacks on behalf of malicious users, as well as perform other bot activities with service provider server 120 that may be used to conduct fraud, attack computing systems, or perform other harmful conduct. In this regard, when communicating and interacting with service provider server 120, network activity logs may record data, including telemetry data for activity parameters 114 of different device components, communications, applications and the like used during interactions with service provider server 120. If activity parameters 114 indicate bot usage and/or activities with service provider server 120, a prediction or classification may be output of whether client device 110 is being used by a valid or malicious user, as well as an explanation of such output. For example, client device 110 may perform certain movements with input devices, provide inputs or navigations, perform copy-paste or other editing activities, and the like with certain input components, applications, operations, and the like, which may be tracked and monitored in network traffic logs having telemetry data for activity parameters 114. The telemetry data for activity parameters 114 may be used to detect pattern differences between automated scripts or attacks and human users. Based on whether these activities indicate fraud, an automated script or attack, and/or a malicious user, a corrective, preventative, or remedial action may be taken, or, if the uses of browser applications 112 are valid, further access and/or use of services from service provider server 120 may be provided, as discussed herein.

Client devices 110 may further include or be associated with a databases 116, which may store various applications and data and be utilized during execution of various modules of client devices 110. Databases 116 may correspond to different types of data storage and components including cloud computing storage nodes, remote data stores and database systems, distributed database systems over network 140, and the like used to store various applications and data. Databases 116 may include, for example, identifiers such as operating system registry entries, cookies associated with browser applications 112 and/or other applications on client devices 110, identifiers associated with hardware of client devices 110, or other appropriate identifiers, such as identifiers used for payment/user/device authentication or identification, which may be communicated as identifying the user/client devices 110 to service provider server 120.

Client devices 110 includes one or more network interface components 118 adapted to communicate with service provider server 120 and/or other devices, servers, and components on network 140. Network interface components 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide services including account and electronic transaction processing services. In this regard, service provider server 120 includes one or more processing applications which may be configured to interact with client devices 110 to generate bot detection rules and rule violations using a generative AI, which may be deployed with a bot detection system and engine implementing ML processes and/or models, including NNs, for detecting suspicious bot activities or behaviors. In one example, service provider server 120 may be provided by PAYPAL®, Inc. of San Jose, CA, USA. However, in other examples, service provider server 120 may be maintained by or include another type of service provider.

Service provider server 120 of FIG. 1 includes a bot detection platform 130, service applications 122, a database 126, and a network interface component 128. Bot detection platform 130 and service applications 122 may correspond to executable processes, procedures, and/or applications with associated hardware. In other examples, service provider server 120 may include additional or different modules having specialized hardware and/or software as required.

Bot detection platform 130 may correspond to one or more processes to execute modules and associated specialized hardware of service provider server 120 to provide a platform, application, and framework to generate, test, deploy and/or compare rules and rule violations for decisions, bot detections, and the like when devices use and interact with service provider server 120, such as client devices 110. As such, rules may be used in decision services, rule-based engines, and the like for intelligent decision-making regarding bot detection, and violations of those rules may correspond the detected telemetry data or the like for one or more device activity parameters that indicate potential bot usage, such as to conduct fraud or engage in computing attacks. In this regard, bot detection platform 130 may correspond to specialized hardware and/or software used by service provider server 120 to provide a rule violation generator 131, which may be used for rule violation generation, testing, and addition to codebooks with corresponding data from logs that may be used to training of models and/or NNs of AI engine 136 for bot detection. In this regard, rule violation generator 131 may generate rule violations in a coding language and/or executable computing code that allows for creation of different codebooks for model training and bot detection in production computing environments, such as with service applications 122.

The rule violations may be generated by a generative AI 132 through prompts after violation teaching with example data or training/finetuning with existing rules/documents. Depending on the generated violation rules, the codebook may be constructed, which may consist of the prototypes associated the generated violations. The steps for rule violation generation may including providing a prompt to an LLM of the generative AI 132. The LLM may then analyze the data provided within the prompt to determine how violated data looks or appears in logs and generate corresponding SQL query to assist us to query violated data from our database. Service provider server 120 may then utilize the generated SQL query to query a database or other data store (e.g., database 126 or the like) to obtain a list of potential violated data points corresponding to that violation. Thereafter, rule violation generator 131 may transform each data point into a vector (e.g., with mouse movement data, a list of mouse movements may be queried that correspond to a potential violation, and a feature extraction technique may transform each mouse movements data to a feature vector. After transforming each datapoint into a vector, a formula or calculation may be used to aggregate all vectors corresponding to the same violation and generate a "prototype" vector. One prototype vector represents one type of violation and may therefore correspond to one entry in the corresponding codebook. In some embodiments, for the formula or calculation, rule violation generator 131 may aggregate vectors corresponding the same violation by calculating the mean value vector as the prototype.

For example, with rule violation generator 131, a generative AI 132 may be utilized to generate rule violations from prompts, where generative AI 132 may correspond to an LLM, GPT, or the like, which may respond to conversational requests and/or dialogue with corresponding conversational or chat responses. In this regard, generative AI 132 may provide a chat-based feature where a user may ask for creation of rule violations from telemetry data of a known or potential bot activity or behavior (e.g., telemetry data for certain ones of activity parameters 114 or other device activity parameters) and examples of past rule violations used or considered by service provider server 120. Generative AI 132 may also provide an explanation, which may correspond to a name, identifier, type, description, or the like of the rule violation, such as mouse movements, edit operation (e.g., copy-paste), form filling or data input, and the like. As such, generative AI 132 may output rule violations with explanations and information that may assist in identifying bot usage and activity by client devices 110 when interacting with service provider server 120.

The generation process of the new violation rules by generative AI 132 may be dependent on the prompts/queries that are fed into generative AI 132, such as the LLM. Such process for prompt generation and/or provision may be done manually (e.g., in a conversational way) or automatically (e.g., with programming scripts). Generative AI 132 may learn from the teaching examples and/or the existing rules or document provided by rule violation generator 131. By utilizing the information synthesizing, inference and generalization abilities of generative AI 32, such as LLMs, GPTs, and the like, after prompting with the requirements and background of tasks, the violation rules for new types of malicious/fraudulent behaviors may be generated. For example, when the LLM recognizes certain mouse movement data, the LLM may utilize knowledge of such data and associated violations gathered from other available data resources. The LLM may then produce potential violations from the prompt that have or have not been seen previously.

Generative AI 132 may initially be trained and generated to have a LLM, GPT, or other conversational AI model that may provide conversational or chat interactions with prompts and requests from users and/or automated endpoints (e.g., applications or scripts that may automate prompting for rule violation generation). However, to specifically tailor generative AI 132 to the tasks for rule violation generation required by service provider server 130, generative AI 132 may be configured, tuned, and/or further trained using example training data 133. Example training data 133 may correspond to example-based violation training, where a LLM or other model of generative AI 132 may be taught on known rule violations of service provider server 120 or other service provider, system, tenant (e.g., customer or partner service, including merchants or the like), or another specific domain. Teaching examples of example training data 133 may correspond to a tuple or other ordered sequence of values, where the individual or discrete values may correspond to the rule violation and corresponding telemetry data for one or more device activity parameters that violate a rule, an identifier or name of the violation and/or explanation or description of the violation, and a query for the telemetry data that may be executed to identify rule violations.

In one embodiment, example training data 133 may have a format of <telemetry data, rule violation, violation query> or other formatting and/or labels, where the LLM or other model of generative AI may be provided different examples of bot activities or behavior (e.g., telemetry data from network traffic logs for device activities parameters, where that telemetry data indicates bot activity, presence, or behavior). This allows the LLM or other model to learn from examples provided in a conversational format and input examples or other example prompts. Further, finetuning or other model tuning may be performed to improve the ability to generate domain-specific rule violations and queries. Finetuning may be done using existing documentations, such as those associated with computing attacks, bot attacks or activities during fraud, fraud detection, user generated content, and the like. Existing rules for rule-based engines may also be provided to the LLM of generative AI 132 for tuning. A sequence-to-sequence (Seq2Seq) model may be used for the finetuning, where the LLM may generate vectors and/or embeddings from input telemetry data that may be decoded by the Seq2Seq model to generate a violation and query, where a cross-entropy loss function (e.g., teacher-forcing loss with scheduled sampling), to performing training and tuning of the LLM for generative AI 132.

Once properly, trained, tuned, and otherwise configured, generative AI 132 may be prompted and queried for rule violations. Prompts 134 may correspond to queries or requests for whether a rule violation may be generated from sample telemetry data, such as a set of telemetry data for one or more device activity parameters that may be of interest, indicate bots or bot activity, and/or be selected based on known or suspected bots and/or bot activity. Further, prompts 134 prompts may also contain some background information, for example, the pre-information for a new task, the list of the data fields in the database for the task, and the like. The telemetry data may be captured, extracted, or identified in one or more network traffic logs or the like, and prompts 134 may identify the telemetry data with a conversational request or query, such as "Can a rule violation be generated from the following data?" with the set of telemetry data to follow. Generative AI 132 may then provide a conversational response that generated the rule violation as the tuple or other ordered set of elements, such as a violation in the format of <telemetry data, rule violation, violation query> or another suitable format.

For each potential rule violation, a corresponding one of rule violation codebooks 135 may be generated and/or the rule violation may be added for training of AI engine 136 for bot detection. For example, rule violation codebooks 135 may have matched data, such as from database 126 or other data storage, to a rule violation, where the matched data corresponds to different telemetry data that is queried from the database using the rule violation query that has been generated and is correlated to the rule violation. Based on the type of prompt entered, generative AI 132 may produce a varying result. As such, prompts may be standardized and/or optimized in order to provide more structured and/or expected results, such as by establishing a set criteria for querying generative AI 132, entering telemetry data in a particular format, and/or creating a query data structure or format for generative AI 132 to standardize querying and responses. As such, the matched data may be correlated to the rule violation by being an example of a potential or prototype rule violation that has been identified. The raw data from the matched data that has been queried may be transformed to features, and a vector may be generated such that rule violation codebooks 135 may be generated having entries representing different rule violations with their corresponding matched telemetry data, which may be in vectorized form for similarity comparisons and model training of AI engine 136.

Thereafter, AI engine 136 of bot detection platform 130 may utilize rule violation codebooks 135 for training and implementing (e.g., in an inference phase for bot detection) a neural network (NN) 137 that includes a deep learning model or other NN or ML model for bot detection by client devices 110, such as when using service applications 122. NN 137 may correspond to a trained AI model that allows AI engine 136 to determine and output bot predictions 138, such as predictions or classifications of potential bot activity or behavior by client devices 110, such as during the usage of service applications 122 (e.g., for account access, transaction processing, etc.). In this regard, generative AI 132, NN 137, and/or other ML or AI models of rule violation generator 131 and/or AI engine 136 may utilize different ML techniques for intelligent decision-making, classifications, predictions, and other outputs.

For the ML techniques, ML models and/or NNs may be used, including decision trees, deep learning models, and the like. Decision trees may include one or more input nodes or other mathematical computations associated with features, additional or hidden processing nodes, and output nodes that form branches where different computations at each node, activation functions, thresholds or value computations and comparisons, and the like may be used to proceed down different branches to a particular output. Similarly, deep learning NNs may use nodes linked in different layers to form neurons that may include input, hidden, and output layers. ML models with multiple layers, including an input layer, one or more hidden layers, and an output layer having one or more nodes, may be used. Each node within a layer is connected to a node within an adjacent layer, where a set of input values may be used to generate one or more output values or classifications. Within the input layer, each node may correspond to a distinct attribute or input data type that is used for the ML model algorithms using feature or attribute extraction for input data.

Thereafter, the internal, interceding, or hidden layers and/or nodes may be generated with these attributes and corresponding weights using an ML or deep learning algorithm, computation, and/or technique. For example, each of the nodes in the hidden or internal layers generates a representation, which may include a mathematical ML or NN computation (or algorithm) that produces a value based on the input values of the input nodes. The algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values that provide an output, classification, prediction, or the like. Thus, when the ML or NN model is used to perform a predictive analysis and output, the input may provide a corresponding output based on the trained classifications.

By providing input data when training a deep learning NN, the nodes in the layers may be adjusted such that an optimal output (e.g., a classification) is produced in the output layer. By continuously providing different sets of data and penalizing the NN when the output of the NN is incorrect (e.g., rules are not determined to be similar), the NN (and specifically, the representations of the nodes in the layers, branches, neurons, or the like) may be adjusted to improve its performance in data classification, such as whether rules are similar when performing pairwise similarity comparison. Thereafter, based on pairwise similarity scores and other outputs, model training may be performed using rule violation codebooks 135 for better or worse examples of telemetry data matching or corresponding to the rule violations. In some embodiments, similarity scores may correspond to measurements between vectors, such as cosine similarity or Euclidean distance.

NN 137, once trained, may then be used for inferences of bot activity, behavior, or other presence and/or use by one or more of client devices 110 with service applications 122 or other components of service provider server 120. This may be done by processing network traffic logs 123 from service applications 122, which have telemetry data 124 that may be processed including processing vectors from telemetry data 124 using NN 137 after feature transformation. Bot detection platform 130 may further provide or relay data to other applications and/or layers for remediation, prevention, or corrective actions and measures to be taken with identified bot and/or classified bot activities by one or more of client devices 110. As such, network traffic logs 123 may be monitored by AI engine 136 for potential bot activity and behavior that may be malicious, fraudulent, or otherwise unallowed.

Service applications 122 may correspond to one or more processes to execute modules and associated specialized hardware of service provider server 120 to process a transaction or provide another computing service, which may be assisted by bot detection platform 130 for detection and prevention of use of bots with service applications 122. In this regard, service applications 122 may correspond to specialized hardware and/or software used by a user associated with client devices 110 to establish a payment account and/or digital wallet, which may be used to generate and provide user data for the user, as well as process transactions. Financial information may be stored to the account, such as account/card numbers and information. A digital token for the account/wallet may be used to send and process payments, for example, through an interface provided by service provider server 120. The financial information may also be used to establish a payment account. Accounts may be accessed and/or used through one or more instances of a web browser application and/or dedicated software application executed by client devices 110 and engage in computing services provided by service applications 122.

The account may be accessed and/or used through a browser application and/or dedicated payment application executed by client devices 110 and engage in transaction processing through service applications 122. Service applications 122 may process the payment and may provide a transaction history to client devices 110 for transaction authorization, approval, or denial. Such account services, account setup, authentication, electronic transaction processing, and other services of service applications 122 may utilize applications and services for risk analysis, fraud detection, and the like, where different applications and services of service applications 122 may be compromised or attacked by bot activities. Service applications 122 may also provide different computing services, including social networking, microblogging, media sharing, messaging, business and consumer platforms, etc. As such, bot detection platform 130 may monitor network traffic logs 123 for whether telemetry data 124 indicates bot behavior.

Service applications 122 may also provide additional features to service provider server 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including one or more GUIs and the like, configured to provide an interface to the user when accessing service provider server 120, where the user or other users may interact with the GUI to more easily view and communicate information. Service applications 122 may include additional connection and/or communication applications, which may be utilized to communicate information to over network 140.

Additionally, service provider server 120 includes or is associated with a database 126 or other data storage component. Database 126 may store various identifiers associated with client devices 110. Database 126 may also store account data, including payment instruments and authentication credentials, as well as transaction processing histories and data for processed transactions. Database 126 may store financial information and tokenization data. Although database 126 is shown as residing on service provider server 120 as a database, in other examples, other types of data storage and components may be used including cloud computing storage nodes, remote data stores and database systems, distributed database systems over network 140 and/or of a computing system associated with service provider server 120, and the like.

Service provider server 120 may include at least one network interface component 128 adapted to communicate client devices 110 and/or other devices or servers over network 140. Network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, network 140 may include the Internet or one or more intranets, landline networks, wireless networks, and/or other appropriate types of networks. Network 140 may correspond to small scale communication networks, such as a private or local area network, or a larger scale network, such as a wide area network or the Internet, accessible by the various components of system 100.

Figure 2:
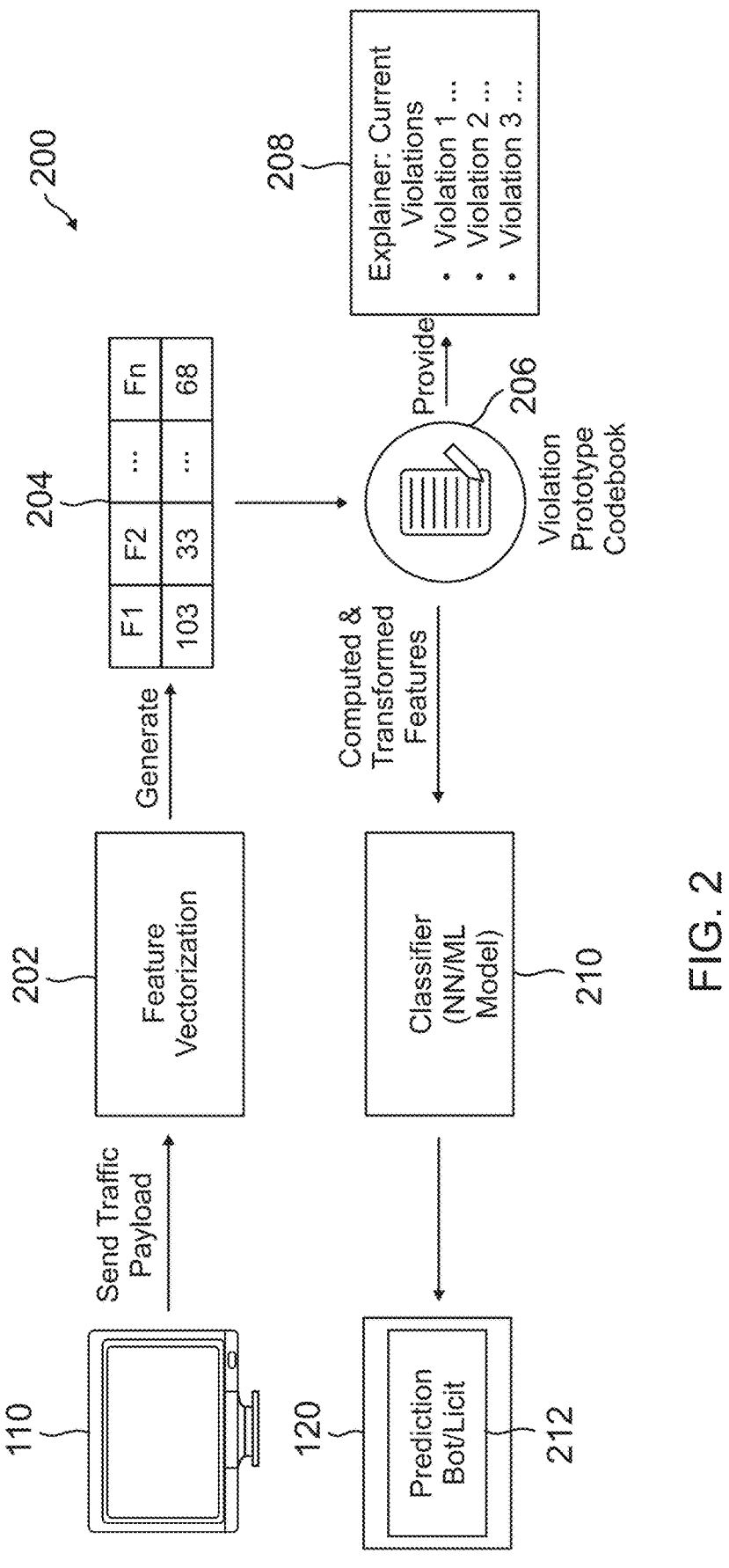
FIG. 2 is an exemplary system environment where rule violations and codebooks for a bot detection neural network from a generative AI may be used during inferences of bot activity or behavior, according to an embodiment.

FIG. 2 is an exemplary system environment 200 where rule violations and codebooks for a bot detection neural network from a generative AI may be used during inferences of bot activity or behavior, according to an embodiment. System environment 200 of FIG. 2 includes an online or real-time production computing environment that may implement a generative AI and deep learning model with explanations for bot detection, such as through bot detection platform 130 of service provider server 120 in system 100 of FIG. 1.

System environment 200 shows how bot detection platform 130 may interact with different components for bot detection in an automated and intelligent manner using AI systems in place of manual generation and coding, and thereafter utilize and implement those rule violations in a deep learning model, such as a neural network for bot detection. In this regard, system environment 200 may include components executing operations to train and utilize a deep learning model, such as NN 137, for bot detection. Rule violations may previously be generated in an automated manner based on prompts of sample telemetry data that may or is associated with bots and/or bot activity/behavior. Rule violations that were generated may have been created using a conversational AI, which may include an LLM, GPT-based model, or the like. Thereafter, telemetry data, such as data from client device 110 including network traffic logged in one or more network traffic logs or other computing logs, may be processed in system environment 200 for detection of bots during an inference phase of model execution. Further, the framework in system environment 200 may be generalized for other tasks as well, such as fraudulent transaction detection tasks using transaction data where an input list of data may be used to generate potential violations that are similarly used for detection of fraudulent transaction instead of bots and bot activity as shown in FIG. 2.

In this regard, traffic payload for network traffic logs may be provided to a feature vectorization 202. Feature vectorization 202 may include a data preprocessing (e.g., data cleaning, reduction, enrichment, validation, etc.) and/or processing (e.g., feature engineering, feature selection, and/or feature transformation) process that is executed to transform raw data to a set of features. Feature vectorization 202 may also include computational processes to generate a feature table 204 that includes mathematical representations of the corresponding features after data transformation (e.g., by converting raw data to feature data). As such FIG. 2 shows a process of inference where features may be computed and transformed from data for use in bot detection. As such, feature vectorization 202 may generate feature table 204 of features of vectors that may be used in a model inference stage shown in FIG. 2.

Feature vectorization 202 may then be used with a violation prototype codebook 206 for inferences of bot behavior. The explainable bot detection pipeline may correspond to a sequence of steps that interact with violation prototype codebook 206 to apply machine learning techniques to identify bots and other fraudulent activity. A feature transformation may be used process the raw telemetry data samples in the training dataset so that the generated feature and the rule representations could be in the same feature space. For each training sample, a similarity vector may be calculated based on the similarity scores evaluated between the generated feature and the violation rule representations, where the similarity scoring may be cosine similarity or Euclidean similarity function. A softmax operation may be used to convert the similarity score vectors into probabilities and each element in the result measures the correlation between this sample and the corresponding violation rule. The representation of the traffic may then be formed by concatenating all the weighted rule representations from violation prototype codebook 206 according to the correlation measurement. Finally, the representation of the traffic may be provided to a deep neural network (e.g., a transformer) for bot prediction.

The generative AI may provide, through conversational output and/or chat, explainer 208 having explanations for why the rule violations exhibit bot activity or behavior (e.g., by having certain telemetry data for device activity parameters being indicative of a bot) and/or why different data from the set of matched data indicates the bot behavior (e.g., how the telemetry data matches the suspected bot telemetry data). The explanations in explainer 208 may be provided in conversational text or chat so that an explanation of bot detection may be easily readable and understandable by a system administrator or other user. This allow the computed and transformed features to be used by a classifier 210, such as a NN or another ML model trained using a corresponding deep learning technique and/or algorithm.

Classifier 210 may make predictions of bot activity using other network traffic logs, such as those in a live production computing environment that may be received during network communications and activity with other endpoints, devices, and the like. Classifier 210 may be used to determine a prediction 212 (e.g., bot behavior or licit/allowable behavior), where operations in the computing environment may monitor and process network traffic logs for prediction 212. Prediction 212 may be determined using classifier 210 and a computing application or operation to monitor network traffic logs. Prediction 212 may correspond to classifications of bot activity from network traffic logs and whether certain interactions, network traffic, and/or devices, servers, or other endpoints are likely bots or bot activity.

Figure 3C:
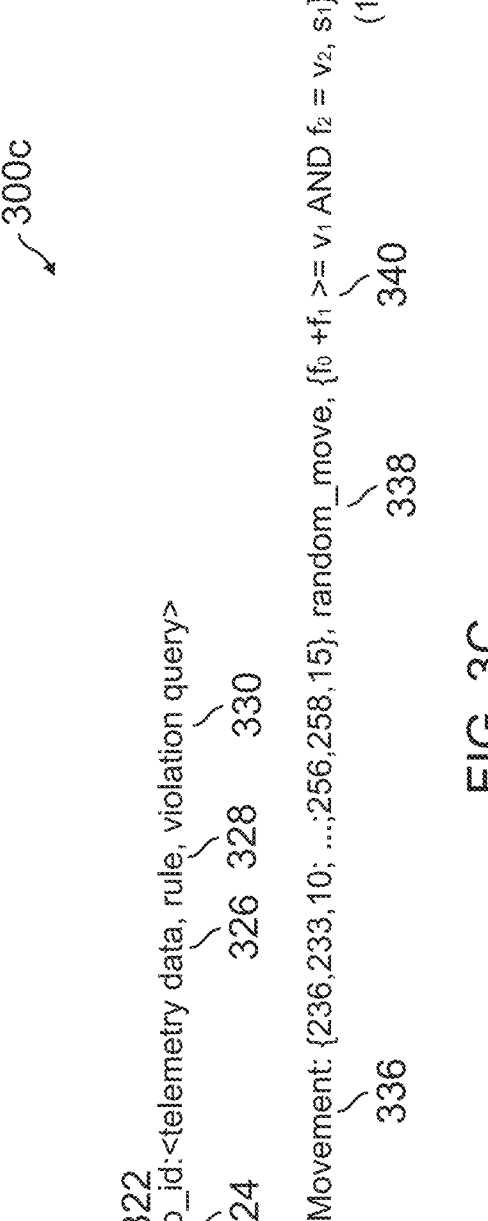

FIGS. 3A-3C are exemplary diagrams 300a-300c of prompts to a generative AI and resulting outputs of rule violations by the generative AI for detecting bots and bot activity, according to an embodiment. Diagrams 300a-300c correspond to exemplary conversational dialogue and/or chats between a user or other prompter (which may be a live user or automated software application/process) that may be used to rule violation generation, such as prompts 134 that are provided to generative AI 132 of service provider server 120 in system 100 of FIG. 1. As such, diagrams 300a-300c may further provide an output rule violation based on such prompts.

Referring now to diagram 300a of FIG. 3A, a first prompt 302 may be provided by a user, such as a data scientist, engineer, administrator, or the like, that requests or queries whether a rule violation may be created from a set of provided telemetry data. First prompt 302 may be provided to a generative AI and codebook generation system for rule violation generation and determination of codebooks for rule violations, which may be used for model training of an AI engine or other system for bot detection. For example, first prompt 302 may include data provided in a conversational request to a generative AI, which may query the generative AI of whether a rule violation may be generated and/or inferred from the provided data. The generative AI may be trained and/or tuned in order to generate domain-specific rule violations from examples of past rule violations for the domain, such as the particular service provider and/or environment, applications, or services where bot activity and interactions may occur. The generative AI may therefore provide a response of telemetry data for device activity parameters that violate a rule, a rule violation identification or explanation, a query for the telemetry data for particular device activity parameters, and the like.

A prototype computation may be performed on the rule violation to generate rule violation prototype codebook, which may include providing an explainer of the rule violations. To generate a codebook, telemetry data in a database may be queried and matched using the query for the generated rule violation. The matched telemetry data may then be added to the codebook so that the codebook includes a set of data that includes prototype examples of network traffic logs and corresponding telemetry data matching or being correlated with the rule violation. Further, matched data may be transformed via a further feature transformation so that the codebook includes the set of features for model training.

In this regard, first prompt 302 includes a conversational request having the query, question, or statement for the generative AI in a conversation or chat that instructs the generative AI of what to do. First prompt 302 first initiates the conversation with a request to learn from an example and includes an example with a set of telemetry data that is directed to a set of mouse movements, such as coordinate or pixel movements and placements of a mouse over time, which may indicate a bot and/or activity of a bot as an example of what may be used to detect a bot, or may, conversely, indicate real human behavior for further training of what does not indicate the bot and/or activity.

First prompt 302 then concludes with the telemetry data for the rule violation and how to structure the violation, including the telemetry data for one or more device activity parameters (e.g., typing), a name or explanation of the rule violation, and a query for how to query a database and/or search network traffic logs for the telemetry data correlated to the rule violation. The generative AI provides a first conversational response 304 that indicates the creation of the rule violation with the rule violation in a format for use with model training and/or database querying for matching telemetry data of examples or prototypes for the rule violation. The rule violation in first conversational response 304 includes a first set of telemetry data 306 for "typing" with corresponding typing delays between keystrokes detected in the telemetry data, a first violation explanation 308 that indicates the violation is for "typing with unusual delays," and a first query 310 that allows another system to search a database or other data storage for network traffic logs and/or telemetry data used to generate prototypes of violations of the rule in a rule violation codebook for the corresponding rule violation. For new types of violations, new explanations may also be generated that may be descriptive of the device activities, telemetry data, or other parameters of the rule violation, which may be created by the generative AI, such as through a LLM. Thus, the response from the generative AI may enable creation of a rule violation codebook and model training for a NN or other AI engine configured to detect bots that perform activities or interactions that are correlated with the generated rule violation.

As such, the codebook generation process may be done prior to training and inference. For the codebook generation process, the built and/or generated prompts may be fed to an LLM or the like of a generative AI system to generate potential violations and then build codebook. For training and inference, data may be collected from traffic and used to generate feature vectors from the data. By comparing the feature vectors from the data to the prototype features from the codebooks, where each prototype feature corresponds to a violation in a codebook. The outputs of the comparisons of the transformed features may then be provided to a classifier for a bot prediction.

Referring now to diagram 300b of FIG. 3B, a second prompt 312 is provided to the generative AI, which may be structured in a similar manner having the example of another rule violation and a set of telemetry data for typing inputs that correspond to a copy-paste action or other repeated character input and/or typing. Although a single example is shown, the generative AI may be trained before first prompt 302 and/or second prompt 312 with multiple examples and/or multiple examples may be provided with first prompt 302 and/or second prompt 312. Here, second prompt 312 may include a different example of telemetry data that may indicate bot activity. As such, when the generative AI responds, a second conversational response 314 is provided that includes a second rule violation as a potential violation with the telemetry data from second prompt 312. The generative AI further provides a second violation explanation 316 that identifies the violation is for repeated character typing (e.g., copy-paste actions that are repeated, such as when performing a credential stuffing attack using a bot to copy-paste potentially compromised credentials from a list). A second query 318 is also provided by the generative AI based on second prompt 312, which allows for rule violation codebook generation and/or addition of the rule violation during training of the model training with the AI engine.

Referring now to diagram 300c of FIG. 3C, a detailed structure for a rule violation and an example of such a violation that may be used for rule codebook generation and AI model training is shown. For example, in a format 322, a violation ID 324 is provided in a format as follows: <telemetry data 326, a rule 328 (e.g., an explanation or identification of the corresponding rule being violated based on telemetry data 326), a violation query 330>. Format 322 may be provided to a generative AI to instruct the generative AI of how to provide a response of a rule violation. Further, an example rule violation 334 may be used for training of the generative AI, which includes a set of mouse movements 336 for telemetry data 326, a rule violation explanation 338 for rule 328, and an activity parameter query 340 for telemetry data 326 that may be used to identify further examples or prototypes of other telemetry data correlated to example rule violation 334. As such, format 322 and example rule violation 334 may be used for generative AI training to provide more accurate and domain-specific rule violations.

FIGS. 4A and 4B are flowcharts 400a and 400b of an exemplary process for bot detection through explainable deep learning and rule violation codebooks from generative AI, according to an embodiment. Note that one or more steps, processes, and methods described herein of flowcharts 400a and 400b may be omitted, performed in a different sequence, or combined as desired or appropriate. Flowchart 400a of FIG. 4A includes operations the system performs for generating rule violations and rule violation codes, as discussed in reference to FIGS. 1-3C above. In some embodiments, flowchart 400a may be performed by one or more computing devices, servers, and/or components discussed in system 100 of FIG. 1.

At step 402 of flowchart 400a, a request to a generative AI that queries the generative AI of whether a violation of a rule can be created from telemetry data from a network traffic logs is received. For example, generative AI 132 in system 100 of FIG. 1 may be trained and tuned using examples of rule violations for a service provider and/or domain (e.g., field, area, computing service or set of services, etc.) such that a LLM, GPT, or other conversational AI may respond to prompts with answers and/or responses of computer-generated rule violations in a conversational format. Prompts 134 may be provided as input to generative AI 132, which queries or requests generation of a rule violation. When prompting generative AI 132, a set of telemetry data, such as in raw form for corresponding device activity parameters, may be provided as input with a request for whether such violation can be created for a rule (e.g., a rule regarding allowed or disallowed inputs, actions, movements, etc., that may be associated with identifying likely or suspicious bot activity). Exemplary violations may also be identified and/or used by the generative AI for responding to the request.

At step 404, the telemetry data for device activity parameters that corresponding to past telemetry data violating the rule is determined from past learned examples by the generative AI. For example, generative AI 132 may utilize example training data 133, which includes examples of other rule violations for the rule or other rules regarding bot activity, to learn types of rule violations and/or telemetry data leading to rule violations (e.g., suspicious activities, inputs, actions, or the like that may indicate bot usage or behavior instead of human behavior). As such, the telemetry data that corresponds to the device activity parameters may be identified and determined, such as mouse clicks, keyboard inputs, editing actions, or the like. As such the telemetry data corresponds to actual values for those parameters and/or ranges of values or different values over a time period. The device activity parameters may be identified in the request and/or based on the past telemetry data as being indicative of bots and/or bot activity.

At step 406, the rule violation using the generative AI, the device activity parameters, and/or queries of network traffic logs for the corresponding device activity parameters in additional telemetry data is generated. Generative AI 132 may output rule violations as tuples or other coded statements as an ordered set of values that includes the corresponding telemetry data required for detection of the rule violation, the type/name/identifier/explanation of the rule violation, and a query for identifying matching data for the rule violation from further network traffic logs, which may be incoming or new logs and/or stored logs used for training a bot detection AI engine.

At step 408, the rule violation is added to a rule violation codebook used by an intelligent detection engine. Rule violation generator 131 may utilize the output rule violations created by generative AI 132 to create rule violation codebooks 135 by querying a database or other source of telemetry data and/or network traffic logs for matching data for the query and rule violation. The matching data may then be transformed to a set of features, where a vector may then be generated. The vector for each data record of telemetry data may be added to one of rule violation codebooks 135, which may be used for NN or other ML model training as examples of potential or prototype bot behavior that corresponds to the rule violation.

Flowchart 400b of FIG. 4B includes operations the system performs for generating rule violations and rule violation codes, as discussed in reference to FIGS. 1-3C above. In some embodiments, flowchart 400b may be performed by one or more computing devices, servers, and/or components discussed in system 100 of FIG. 1.

At step 412 of flowchart 400b, network traffic logs are monitored using a bot prediction AI engine and the rule violation codebook. Client devices 110 may interact with service provider server 120 to utilize service applications 122, such as for electronic transaction processing, account services, and the like, which may cause generate of network traffic logs 123 that record network traffic and communications from such interactions and activities of client devices 110 when utilizing service applications 122. Network traffic logs 123 may include telemetry data 124 that corresponds to the measured, recorded, and/or collected data from monitoring such traffic and communications. As such, AI engine 136 may monitor and review network traffic logs 123 in order to identify bots and/or bot activity based on telemetry data 124.

At step 414, the network traffic logs are checked using the rule violation codebook for telemetry data associated with a device activity parameter. AI engine 136 may execute NN 137 trained using rule violation codebooks 135 and/or training data (e.g., for licit or allowable samples and activities, as well as illicit or unallowable samples and activities) to identify whether telemetry data 124 indicates bots and/or bot activity, such as whether portions or telemetry data 124 for one or more device activity parameters indicate bot activity based on rule violations and rule violation codebooks 135 that include predicted or prototypes of corresponding telemetry data for a rule violation. As such, rule violation codebooks 135 may include a set of data, or transformed features from the data, that has been matched to the rule violation generated by generative AI 132, such as by querying database 126 or other data storage for past telemetry data using the corresponding query for the rule violation. As such, the data, or transformed features, may have a corresponding similarity and/or likelihood or confidence of being correlated to the rule violation (e.g., indicating a bot or bot activity). NN 137 may be trained to detect when telemetry data 124 has a sufficient likelihood and/or meets or exceeds a threshold similarity to the past telemetry data corresponding to the rule violation.

At step 416, it is detected that one of the network traffic logs includes the telemetry data, such as for a bot activity. For example, AI engine 136 may execute NN 137 to process features transformed from network traffic logs 123 to provide a corresponding output, such as a classification or prediction of whether one or more of network traffic logs 123 indicate a presence or activity of a bot when interacting with service applications 122. Detection may occur when the transformed features are input and a corresponding output of NN 137 identifies the telemetry data corresponding to the rule violation. As such, the telemetry data that is detected by AI engine 136 may then be processed to determine whether there is a prediction of bot usage and/or activity, such as behaviors that indicate a presence and/or use of a bot with computing services 122.

At step 418, a prediction whether a device associated with the network traffic log is using a bot to violate the rule is outputted. NN 137 classifies or predicts bot activity and/or behavior as indicated by telemetry data 124 matching or being correlated with the telemetry data for the rule violation and/or found in rule violation codebooks 135. This may include providing an output score, such as a confidence score or the like, of bot activity, which may be compared to a threshold for detecting that the telemetry data for the device activity parameters indicates a bot. As such, the prediction may be output that classifies one or more of network traffic logs 123 (and therefore the corresponding device, IP address, and/or endpoint associated with the network traffic from the log(s)) as being a bot and/or indicating bot activity or being valid, allowable, or human behavior.

As discussed above and further emphasized here, flow-charts 400a and 400b of FIGS. 4A and 4B may be executed by service provider server 120 when generate rule violations and using the rule violations to train an AI engine for bot detection, which examples should not be used to unduly limit the scope of the claims. One of ordinary skill in the art would recognize many variations, alternatives, and modifications.

Figure 5:
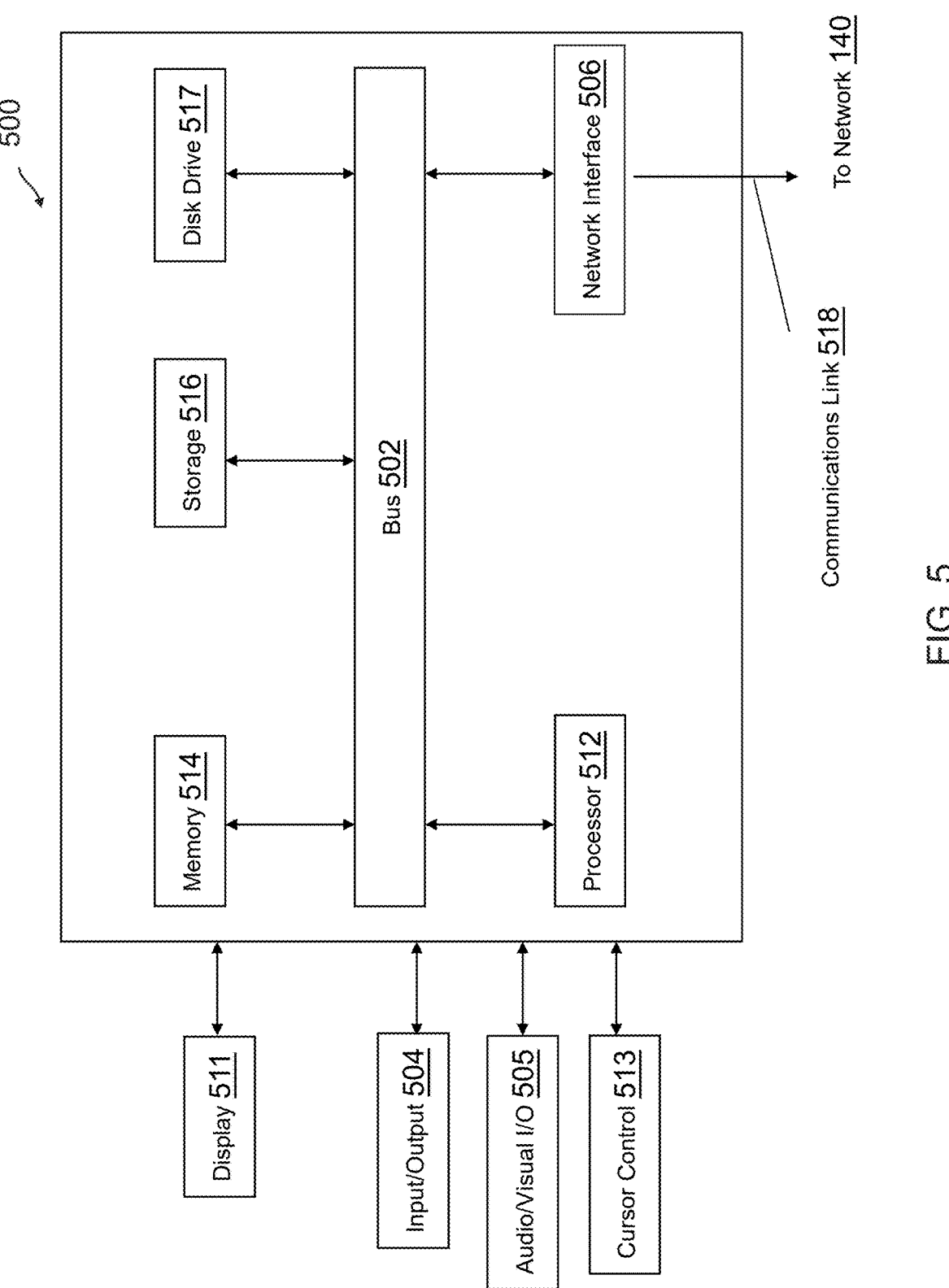
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:

a non-transitory memory; and one or more hardware processors coupled to the non-transitory memory and configured to read instructions from the non-transitory memory to cause the service provider system to perform operations comprising:

generating a plurality of rule violations using a generative artificial intelligence (AI) of an AI engine, past telemetry data, and one or more examples of a plurality of rule violations by bot behavior associated with an automated computing bot;

receiving network traffic logs;

searching, based on a query for telemetry data associated with a device parameter, the network traffic logs using the AI engine that includes a rule violation codebook of the plurality of rule violations for a rule associated with bot activity, wherein the query corresponds to one of the plurality of rule violations having an example of the telemetry data that violates the rule and a corresponding violation type;

detecting, based on the searching, that one of the network traffic logs includes the telemetry data; and outputting, using the AI engine and based on the detecting, a prediction that a device associated with the one of the network traffic logs is executing the automated computing bot that violates the rule.

2. The service provider system of claim 1, wherein the operations further comprise:

transforming features from the network traffic logs to a plurality of vectors;

storing the plurality of vectors in a data table accessible by a classifier of the AI engine; and querying the data table for the telemetry data using the classifier and the query.

3. The service provider system of claim 2, wherein the operations further comprise:

determining one of the plurality of vectors associated with the telemetry data and the query based on a threshold similarity of a query vector for the query to the plurality of vectors; and identifying the one of the network traffic logs corresponding to the one of the plurality of vectors.

4. The service provider system of claim 2, wherein the classifier comprises an explainable deep learning model that classifies bot activities associated with at least the automated computing bot and the rule.

5. The service provider system of claim 1, wherein the AI engine comprises a deep neural network model that analyzes vector representations associated with the network traffic logs and the rule violation codebook in a same feature space using a similarity function.

6. The service provider system of claim 1, wherein the generative AI is configured to process a conversational request during an automated chat session, and wherein the generative AI determines, based on the conversational request, whether the past telemetry data are associated with the one or more example of the rule violations.

7. The service provider system of claim 1, wherein the generative AI comprises a large language model tuned using domain-specific materials associated with plurality of rule violations for the service provider system, and wherein the domain-specific materials include at least one of existing documentations for the plurality of rule violations or existing rules from rule-based engines of the service provider system.

8. The service provider system of claim 1, wherein the rule is associated with a rule violation explanation usable with the prediction to explain the prediction of the automated computing bot, and wherein the rule violation explanation comprises at least one of an identifier associated with a cause or a reason of the prediction of the automated computing bot, a description of the cause or the reason, or a name of the rule.

9. The service provider system of claim 1, wherein the telemetry data comprises computing activities from the network traffic logs that occurred with a computing service provided by the service provider system.

10. A method comprising:

receiving a network traffic log having telemetry data associated with a device parameter of a computing device corresponding to the network traffic log;

processing the telemetry data using an artificial intelligence (AI) engine that includes a rule associated with identifying a bot activity based on the telemetry data, wherein the rule is based on an example of a value of the telemetry data indicating the bot activity;

determining, based on the processing, that the network traffic log includes the value of the telemetry data indicating the bot; and executing a remedial action with the computing device that prevents an additional computing attack using the bot activity, wherein the AI engine comprises a generative AI trained using a plurality of example violations of the rule, and wherein the plurality of example violations includes past telemetry data that includes the value, a violation of the rule, and/or an identification of the rule violation.

11. The method of claim 10, wherein, prior to the receiving the network traffic log, the method further comprises:

training an AI model of the AI engine using a rule violation codebook, wherein the rule violation codebook comprises a plurality of rule violations including the rule and vectors corresponding to past telemetry data for past network traffic logs that were correlated with the plurality of rule violations.

12. The method of claim 11, wherein, prior to the training, the method further comprises:

generating the rule violation codebook based on the past telemetry data, a feature transformation operation for the past telemetry data to the vectors, and one or more identified bot activities associated with the past telemetry data.

13. The method of claim 12, wherein the generating the rule violation codebook utilizes a generative AI and one or more generative AI prompts that query the generative AI whether the plurality of rule violations can be determined from the past telemetry data.

14. The method of claim 11, wherein the AI model comprises a deep learning model for a neural network, and wherein the neural network further includes an explainer configured to output explanations of bot activity based at least on the rule violation and the value for the telemetry data.

15. The method of claim 11, further comprising:

deploying the AI model with a bot detection platform that monitors incoming network traffic logs including the network traffic log.

16. A non-transitory machine-readable medium having stored thereon machine-readable instructions executable to cause a machine to perform operations comprising:

creating a rule violation codebook using telemetry data that is correlated with a device activity parameter that indicates a rule violation of a bot activity by a bot when a value of the device activity parameter in the telemetry data is detected;

training an artificial intelligence (AI) engine using the rule violation codebook;

monitoring the telemetry data of incoming network traffic logs using the AI engine;

querying a generative AI of the AI engine for a detection of the rule violation in the incoming network traffic logs;

detecting, based on the monitoring, that one of the incoming network traffic logs includes the value of the device activity parameter in the telemetry data; and classifying, by the AI engine and based on the detecting, that the one of the incoming network traffic logs indicates the bot or the bot activity by the bot.

17. The non-transitory machine-readable medium of claim 16, wherein the creating the rule violation codebook includes performing a feature transformation of raw data for the telemetry data to a set of features for one or more data vectors.

* * * * *